US007805448B2

(12) United States Patent
Andrzejak et al.

(10) Patent No.: US 7,805,448 B2
(45) Date of Patent: Sep. 28, 2010

(54) STORING ATTRIBUTE VALUES OF COMPUTING RESOURCES IN A PEER-TO-PEER NETWORK

(75) Inventors: Artur Andrzejak, Berlin (DE); Zhichen Xu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2505 days.

(21) Appl. No.: 10/418,075

(22) Filed: Apr. 18, 2003

(65) Prior Publication Data

US 2004/0210624 A1 Oct. 21, 2004

(51) Int. Cl.
*G06F 17/30* (2006.01)

(52) U.S. Cl. ........................................ 707/747; 709/238

(58) Field of Classification Search ................. 707/741, 707/747; 709/238
See application file for complete search history.

(56) References Cited

U.S. PATENT DOCUMENTS

| | | | | |
|---|---|---|---|---|
| 6,029,195 | A | * | 2/2000 | Herz ........................... 725/116 |
| 6,182,064 | B1 | * | 1/2001 | Shorter et al. ....................... 1/1 |
| 6,857,012 | B2 | * | 2/2005 | Sim et al. .................... 709/222 |
| 6,889,229 | B1 | * | 5/2005 | Wong et al. ......................... 1/1 |
| 2004/0085329 | A1 | * | 5/2004 | Xu et al. ..................... 345/629 |

OTHER PUBLICATIONS

Asano, T. et al, "Space Filling Curves and Their Use in Geometric Data Structures", Theoretical Computer Science, 181, p. 3-15, 1997.
Clarke, I. et al., "Freenet: A Distributed Anonymous Information Storage and Retrieval System", Workshop on Design Issues in Anyonymity and Unobservability, Berkeley, CA, 2000.
Czajkowski, K. et al., "Grid Information Services for Distributed Resource Sharing", 10th IEEE. International Symposium on High Performance Distributed Computing, IEEE Press, 2001.
Dabek, F. et al., "Wide-area Cooperative Storage with CFS", SOSP '01, Canada, 2001.
Kubiatowicz, J., et al., "OceanStore: An Architechture for Global-Scale Persistent Storage" ASPLOS 2000.
Ratnasamy, S. et al., "A Scalable Content-Addressable Network" ACM SIGCOMM, San Diego, CA, 2001.
Stoica, I. et al., "Chord: A Scalable Peer-To-Peer Lookup Service for Internet Application", ACM SIGCOMM, San Diego, CA, 2001.
Iamnitchi, A. et al., "On Fully Decentralized Resource Discovery in Grid Environments", International Workshop on Grip Computing, CO, 2001.
Waterhouse, S., "JXTA Search: Distributed Search for Distributed Networks", Sun Microsystems, May 29, 2001.
Xu, Z. et al., "Turning Heterogeneity to an Advantage in Overlay Routing", HPL-2002-126.
Xu, Z. et al., "Building Low-Maintenance Expressways for P2P", HPL-2002-41.
Zhang, Z. et al., "Scalable, Structured Data Placement Over P2P Storage Utilities", HPL-2002-40.

* cited by examiner

*Primary Examiner*—James Trujillo
*Assistant Examiner*—Jorge A Casanova

(57) ABSTRACT

A system comprises a plurality of computing resource. Attribute values for the computing resources are stored in a peer-to-peer network in the system. A method for storing an attribute value comprises receiving an attribute value for a resource in the system, identifying a node in the peer-to-peer network for storing the attribute value, wherein the node stores a range of attribute values encompassing the received attribute value, and storing the attribute value at the identified node.

31 Claims, 15 Drawing Sheets

STORING ATTRIBUTE VALUES OF COMPUTING RESOURCES IN A PEER-TO-PEER NETWORK

FIELD

This invention relates generally to network systems. More particularly, the invention relates to a peer-to-peer network storing attributes for computing resources.

DESCRIPTION OF THE RELATED ART

In an information retrieval system, information can be characterized by a set of attributes. For example, a computing resource may be characterized by operating system, network address, central processing unit (CPU) speed, storage capacity, etc. A fundamental function of information retrieval systems is the search for information with specific combinations of attributes values. However, the search for such information may be hampered by the vast quantities of information relating to the attributes. One technique to assist in the searching for information is to index the attributes (or requested information).

In a peer-to-peer (P2P) system, an index may be implemented by using a distributed indexing infrastructure. One advantage of this approach is the self-organizing characteristics, fault tolerance, and scalability inherent with P2P systems may be incorporated into the distributed indexing infrastructure.

However, there are also disadvantages and drawbacks to using P2P systems to implement the distributed indexing. For instance, in earlier P2P systems, such as Gnutella or Frecnet, a search request is performed by flooding the request/query in the P2P system. The large amount of traffic generated by flooding the request tends to encumber the throughput and/or efficiencies of the network. Moreover, these earlier systems could not guarantee finding requested data even if the data was stored in the system.

Later generations of P2P systems (e.g., Tapestry, Chord, CAN, etc.) often feature a deterministic structure by mimicking a distributed hash table (DHT). As a result, these P2P systems are able to locate each item of requested information. In addition, the later generations of P2P systems may also provide performance guarantees in terms of logical hops while taking advantage of network proximity.

Although relatively efficient in the search of information, the later generations of P2P systems still suffer drawbacks and disadvantages. More particularly, these P2P systems may efficiently index distinct values. However, these P2P systems do not provide a mechanism for indexing a range of values. In some instances, a user may seek a range of values, such as a range of values greater than a threshold. As such, the later generation P2P systems implementing a DHT do not typically support range queries, such as a series of requested attributes. Instead, a user must select each discrete value of attributes for querying, which is time-consuming and inefficient.

SUMMARY

According to an embodiment, a method of storing attribute values at a plurality of nodes in a peer-to-peer network comprises receiving an attribute value for a computing resource; identifying a node of the plurality of nodes for storing the attribute value, wherein the node stores a range of attribute values encompassing the received attribute value; and storing the attribute value at the identified node.

According to another embodiment, a method of identifying one or more computing resources in a system meeting a query comprises receiving a query including a range of attribute values; identifying an area in a peer-to-peer network associated with the range of attribute values, the peer-to-peer network storing attribute values for the computing resources in the system; and flooding the query in the area.

According to yet another embodiment, a grid comprises a plurality of distributed computing resources, and a subset of the plurality of distributed computing resources forming a peer-to-peer network. The peer-to-peer network comprises a distributed-hash-table, overlay network, wherein each node of the peer-to-peer network owns a zone in the overlay network and each node stores attributes of the plurality of distributed computing resources. At least some of the zones in the overlay network are mapped to ranges of attribute values representing attributes of at least some of the plurality of distributed computing resources in the grid, such that nodes storing close-by ranges are proximally located in the overlay network.

According to yet another embodiment, an apparatus comprises means for receiving an attribute value for a computing resource in a system; means for identifying a node in a peer-to-peer network for storing the attribute value, wherein the identified node stores a range of attribute values including the received attribute value; and means for routing the attribute value to the identified node.

Yet another embodiment pertains to a system for placement in a network. The system includes at least one processor, a memory coupled to the at least one processor; and a maintenance module stored on the memory and executed by the at least one processor. The maintenance module is configured to associate ranges of attributes with interval keepers, wherein the interval keepers are located in a network based on a relation of each range of values stored in each interval keeper.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
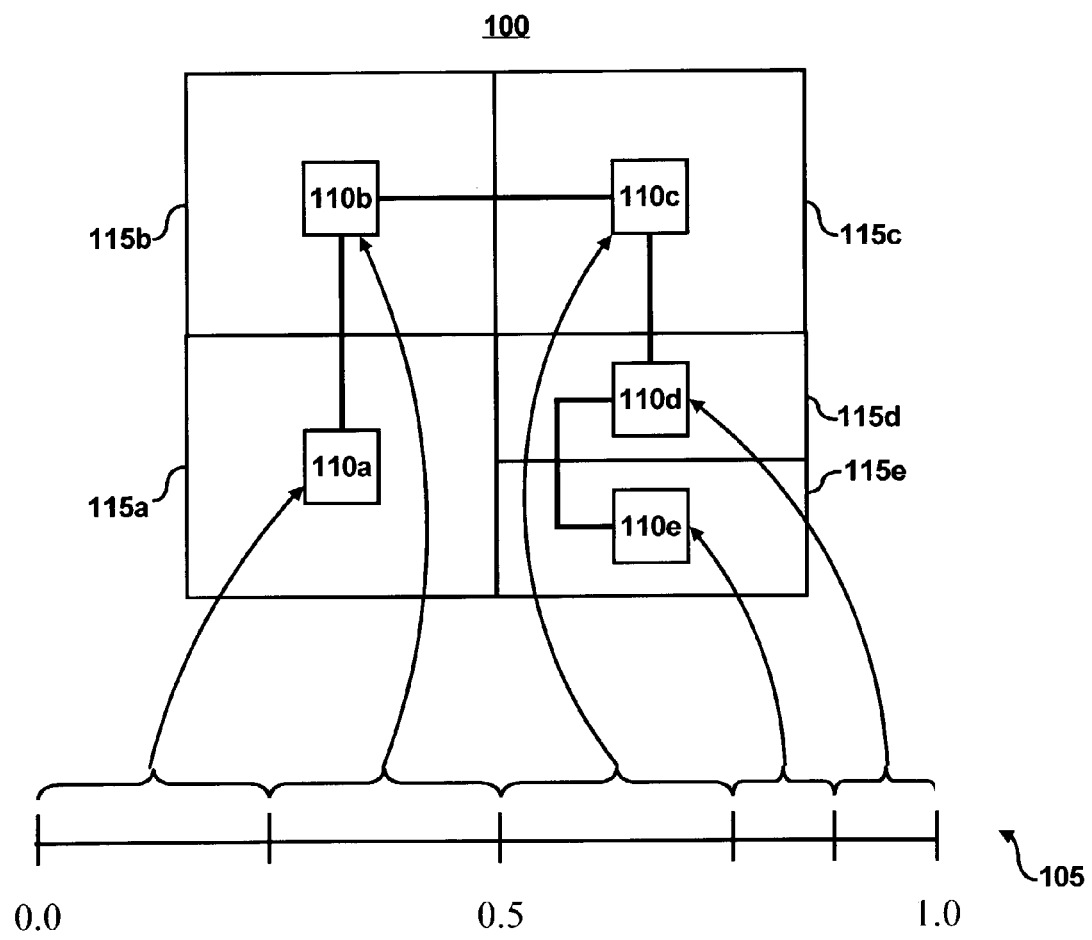
FIG. 1 illustrates an exemplary block diagram of an embodiment.

For simplicity and illustrative purposes, the principles of the present invention are described by referring mainly to an exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment, information (e.g., attributes) is placed in a controlled manner in a P2P network to reflect the correlation in the information. The P2P network is comprised of a distributed hash table (DHT) overlay network. Objects are stored in the DHT overlay network in key pairs, each pair including an attribute value and a respective identification. The attribute value is a real number and the identification is a handle (or address) to a node in the P2P network storing the object. The attribute values may include distinct values or a range from one value to another value. For the sake of convenience, the range of values is assumed to be (0.0, 1.0).

The nodes participating in the DHT overlay network, i.e., interval keepers, store the objects. The interval keepers may monitor and report for a sub-interval in the range of values for a particular attribute. The interval keepers may also own a zone in a logical d-dimensional space (i.e., a d-torus) of the DHT overlay network. The d-dimensional space is partitioned into zones, where the owner of the zone is an interval keeper. As such, the sub-intervals of a range of attribute-values are mapped to zones. Thus, if two interval keepers have close-by intervals, then also their respective zones should be proximally located. Therefore, interval keepers having close-by ranges are generally within a predetermined number of hops from each other.

According to an embodiment, the objects stored in the P2P network include attribute values for computing resources in a distributed computing system. The attributes, for example, may include operating system, network address, central processing unit (CPU) speed, storage capacity, etc. The attribute values may include a numeric representation of the computing resource attributes. The attribute values are indexed in the P2P network. For example, interval keepers may store a range of attribute values and/or discrete attribute values. These attribute values are indexed and may be searched to identify one or more computing resources having particular attributes. The attribute values are placed in the P2P network based on the similarity of the values (i.e., close by attribute values/ranges are proximally located). This minimizes routing costs and message traffic.

In one example, the distributed computing system may include a grid. A grid may provide means for sharing computing power, storage capacity, instruments, data, and applications. A grid may include a large number of computing resources (e.g., hundreds, thousands, or millions) linked together in local or regional networks, which may in turn be connected on a global level. The computing resources may be owned by several organizations for large grids.

To enable efficient and appropriate uses of the computing resources, availability and attributes of the computing resources may be tracked. The interval keepers of the P2P networks index the attributes of the computing resources. Therefore, if a particular user needs a computing resource having particular attributes, the user may query the interval keepers to find a computing resource in the grid. Ranges may be included in the query (e.g., memory>256 MB, processor>2 GHz, etc.) to identify computing resources. According to several embodiments, different querying methods are provided for querying the interval keepers. It will be apparent to one of ordinary skill in the art that the embodiments described herein are applicable to all types of systems of varying sizes rather than being limited to a grid.

FIG. 1 illustrates an exemplary block diagram of an embodiment. As shown in FIG. 1, P2P system 100 may include interval keepers 110*a* . . . 110*e*. The interval keepers are peers within the P2P system 100 that have additional tasks of monitoring and reporting a range of attributes. For instance, node 110*a* may be responsible for monitoring and reporting the range of attributes that have values from (0, 0.25). These values may represent a range (or sub-interval) for a particular computing resource attribute (e.g., storage capacity, processor speed, etc.). Similarly, node 110*b* may be responsible for the range of (0.25, 0.50); node 110*c* may be responsible for the range of (0.50, 0.75); node 110*d* may be responsible for the range of (0.75, 0.875); and node 110*e* may be responsible for the range of (0.875, 1.0). As such, any node that contains the attribute that falls within an interval keeper's range is assigned thereto. The nodes 110*a* . . . *e* (i.e., interval keepers) may store discrete values also. For example, a value representing an operating system-type for a computing resource may be stored at node 110*a*. In other embodiments, the select of nodes for the interval keepers may vary according to the type of attribute and workload of the interval keepers. Moreover, as shown in FIG. 1, the respective zones 115*a* . . . 115*e* of the nodes 110*a* . . . 110*e* are in proximity depending on the sub-interval values. Also, the interval keepers 100*a* . . . 110*e* may be included in a P2P network used in a grid for indexing attribute values associated with resources in the grid.

In another embodiment, the placement of the zone of the interval keepers follows a space-filling curve (e.g., a Hilbert curve, a gray code curve, z-curve, etc.) to preserve the proximity relationships of the sub-intervals. As shown in FIG. 1, the zones 115*a* . . . 115*e* are ordered accordingly to a Hilbert Curve. As such, the respective intervals of the zones 115*a* . . . 115*e* are ordered to progressive increasingly ranges of attributes values.

In yet another embodiment, the placement of new zones may be determined based on the space-filling curve. More particularly, if a given interval keeper becomes burdened with reporting and monitoring functions, the given interval keeper may select a new additional interval keeper to share the responsibilities. The selection of the placement of the new zone may be done according to a space-filling curve (e.g., a Hilbert curve). For example, in FIG. 1, assume zone 115d originally covers the area of zones 115d and 115e. Given that node 115d determines that the node 115d has become too overloaded for the monitoring responsibilities (e.g., the number of objects stored at the node 115d exceeds a threshold), node 115d may select a new node to share responsibilities for the sub-interval of node 115d. As shown in FIG. 1, node 115d selected 115e and has divided the respective zones according to a space-filling curve. In addition, node 115d has divided the original sub-interval (0.75, 1.0) into intervals of (0.75, 0.875) for node 115d and (0.875, 1.0) for node 115e.

In yet another embodiment, queries for a range of attributes values may be implemented using a flooding approach. More specifically, a requestor may compute a minimal-enclosing hypercube surrounding the requested range. By way of example, sample points may be generated along the requested range to determine the hypercube, h. The requestor may also compute a middle point, p, of the requested range. The requestor may then form a query message to the node owner of the middle point, p, that comprises of address of the requestor and the hypercube, h, as part of the payload.

Subsequently, when the query message is received at the node owner, the node owner responds to the requester with the range of attribute-values maintained therein. The query message is then forwarded to the each of its neighbor nodes if the neighbor nodes' zone intersect with the hypercube, h. Thereafter, the process reports for at each neighbor node receiving the query message.

In yet another embodiment, queries for range of attribute values may be implemented using a controlled flooding technique. More particularly, a requestor may compute the center of a requested range, p. The requestor may also form a query message to the node owner of the center that comprises of the requested range and the identity of the requester. The requestor may forward the query message to the node owner of the center of the requested range, p.

Subsequently, the node owner may forward the range of attributes maintained by the node owner to the requestor. The node owner may compare the neighbor nodes' ranges with the range of the requested range. The node owner forwards the query message to each of the neighbor nodes where the neighbor node intersects with the requested range. Thereafter, the neighbor node repeats the process of reporting and forwarding.

In yet another embodiment, range queries may be implemented by a directed controlled flooding. More specifically, a requestor may compute the center of a requested range, p. The requester may also form a query message to the node owner of the center that comprises of the requested range, the identity of the requester, and a direction flag. The direction flag indicates which direction a query message will be directed. The requestor may forward the query message to the node owner of the center of the requested range, p.

Subsequently, the node owner may report its attribute values to the requestor. The node owner may then compare each neighbor node's zone with the requested range along with the direction flag in the query message. The query message is forwarded to the neighbor node where the neighbor node interval is greater than the node owner and the direction flag indicates an upward direction. The query message is forwarded to the neighbor node where the neighbor node's interval is less than the node owner and the direction flag indicates a downward direction, thereby a directed controlled flooding.

Thereafter, each neighbor node receiving a query message may repeat the process of reporting and forwarding.

Figure 2:
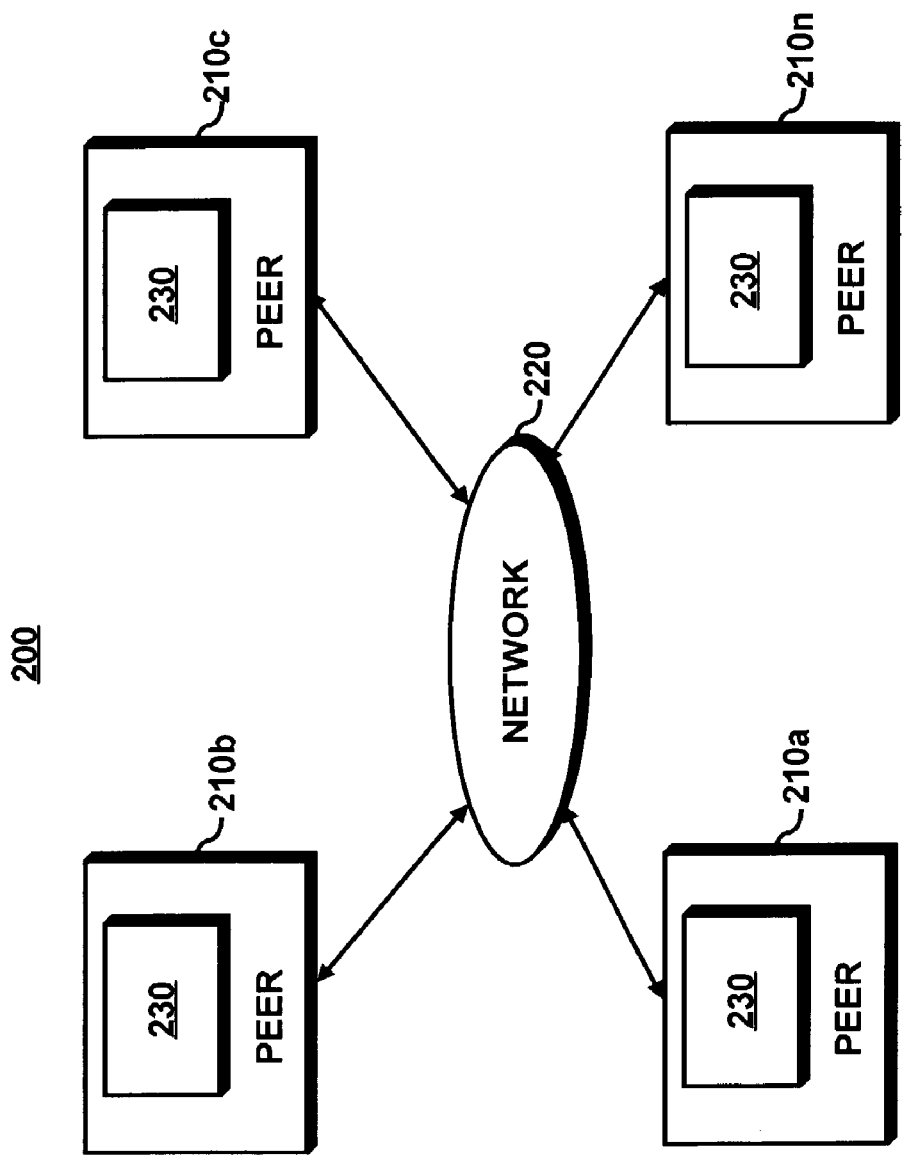
FIG. 2 illustrates an exemplary block diagram of a system where an embodiment may be practiced.

FIG. 2 illustrates an exemplary block diagram of a system 200 where an embodiment may be practiced. It should be readily apparent to those of ordinary skill in the art that the system 200 depicted in FIG. 2 represents a generalized schematic illustration and that other components may be added or existing components may be removed or modified.

As shown in FIG. 2, the system 200 includes a plurality of peers $210a \ldots 210n$. The peers $210a \ldots 210n$ may be configured to exchange information among themselves and with other network nodes over a network 220. The peers $210a \ldots 210n$ may be computing platforms (e.g., personal digital assistants, laptop computers, workstations, and other similar devices) that have a network interface. The peers $210a \ldots 210n$ may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 220 may be configured to provide a communication channel among the peers $210a \ldots 210n$. The network 220 may be implemented as a local area network, wide area network or combination thereof. The network 220 may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

Figure 3A:
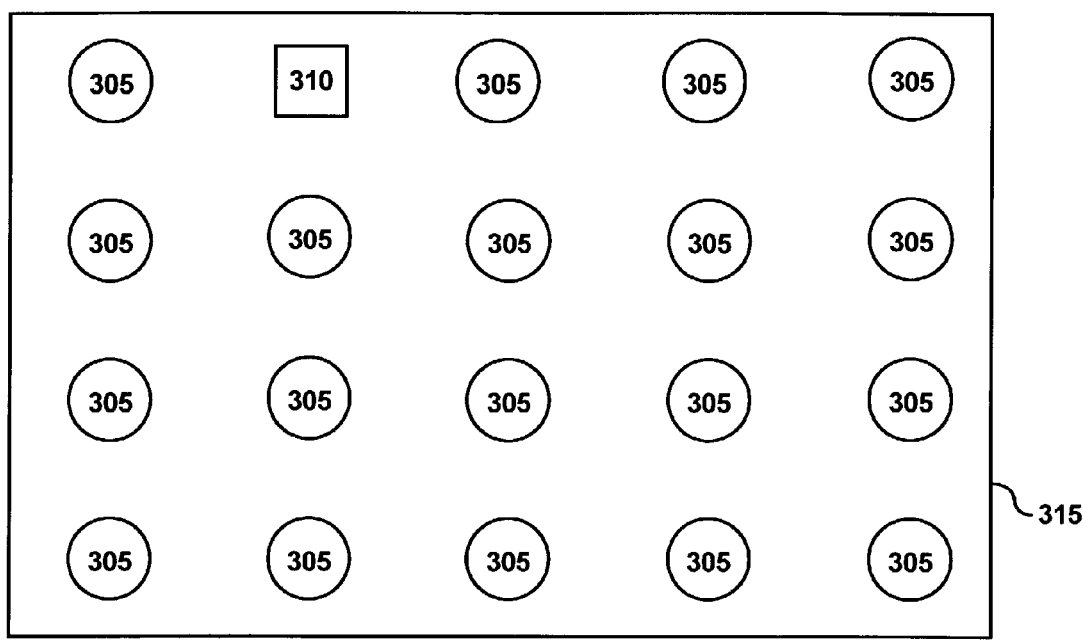
FIGS. 3A-C illustrates a block diagram of the placement of nodes in accordance with yet another embodiment.

According to an embodiment, each peer of the peers $210a \ldots 210b$ may include a range query module 230. The range query module 230 may implement the DHT overlay network as described supra and in further detail below for controlled placement of objects in the DHT overlay network. With respect to FIG. 3A, a system 300 may include nodes 305. The nodes 305 may be implemented as clients, servers, or other similar type of networking device. As shown in FIG. 3A, a node may be selected as interval keeper 310. As such, the range query module 230 executing on interval keeper 310 may maintain the range of attribute-values for nodes 305, e.g., [0.0, 1.0] and to respond to range queries for nodes 305. The interval keeper 310 may also form a zone 315, e.g., an eCAN zone, for the reporting nodes 305. The range query module 230 may determine by comparing a metric associated with the interval keeper 310 that it has become overloaded or not operating within specified operating parameters. Then, the range query module 230 of 310 may select another interval keeper from nodes 305 as illustrated in FIG. 3B.

Figure 3B:
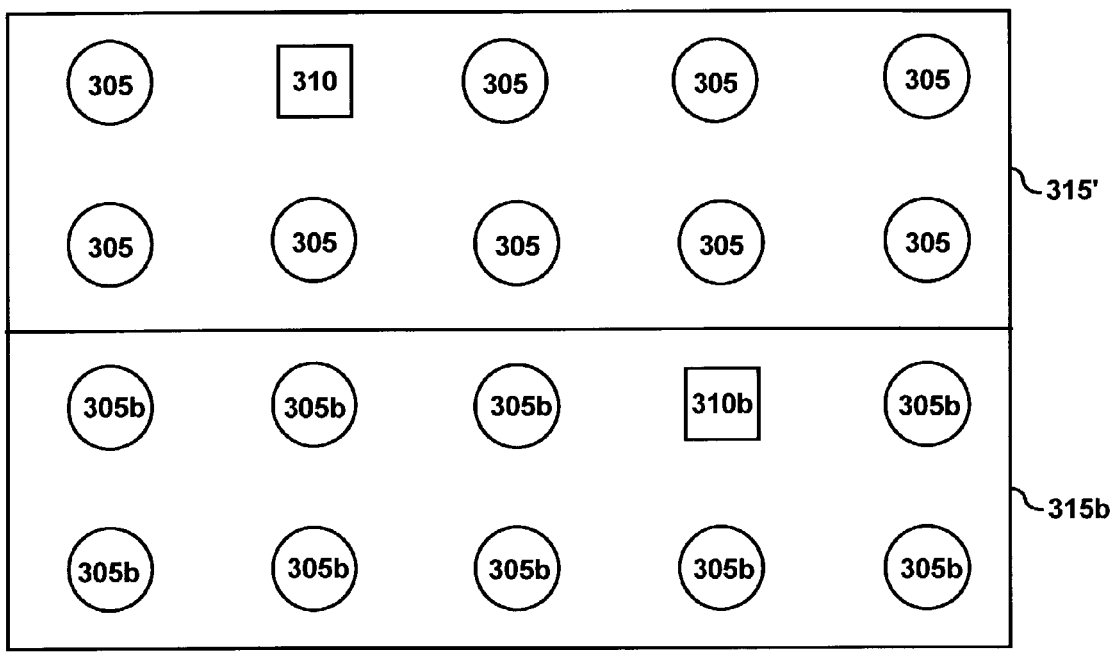

As shown in FIG. 3B, interval keeper 310 has selected interval keeper 310b to split the interval of interval keeper 310. As such, interval keeper 310 has divided its original zone 315 into two zones, 315' and 315b. Interval keeper 310 may be responsible for zone 315' and interval keeper 310b may be responsible for zone 315. Moreover, interval keeper 310 has also divided the original interval of [0.0, 1.0] between interval keepers 310 and 310b, where interval keeper 310 may be responsible for the sub-interval of [0.0, 0.5] and interval keeper 310b may be responsible for the rest of the original interval. The selection of the zones and of the sub-intervals may be based on a space-filling curve such as a Hilbert Curve. As such, the distribution of the sub-intervals and/or zones may be reversed.

Accordingly, the subset of nodes 305 that have attribute values falling within the sub-interval [0.0, 0.5] may then be included in zone 315' and a second subset of nodes 305 having attribute values within the second sub-interval [0.5, 1.0] may then be included in zone 315b.

Figure 3C:
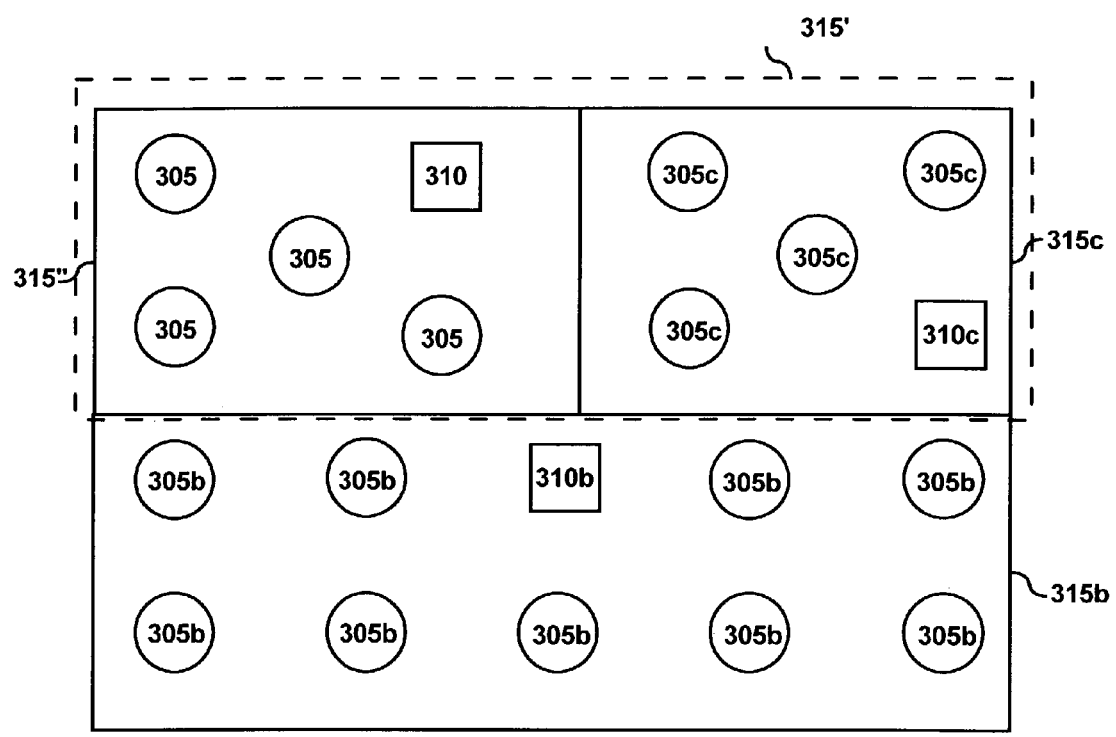

With respect to FIG. 3C, the range query module 230 of interval keeper 310 may determine it is overburdened or not operating within specified parameters. As such, the range query module 230 may select another node to become interval keeper 310c. The range query module 230 may also divide its existing zone 315' into two zones, 315" and 315c. The range query module may further apportion its sub-interval into two smaller intervals: [0.0, 0.25] and [0.25, 0.50]. Since the zones and sub-intervals are apportioned according to a space-filling curve, interval keeper 310 may be responsible for the nodes reporting within the sub-interval [0.25, 0.50] and interval keeper 310c may be responsible for the nodes reporting within the sub-interval [0.0, 0.25].

Figure 4:
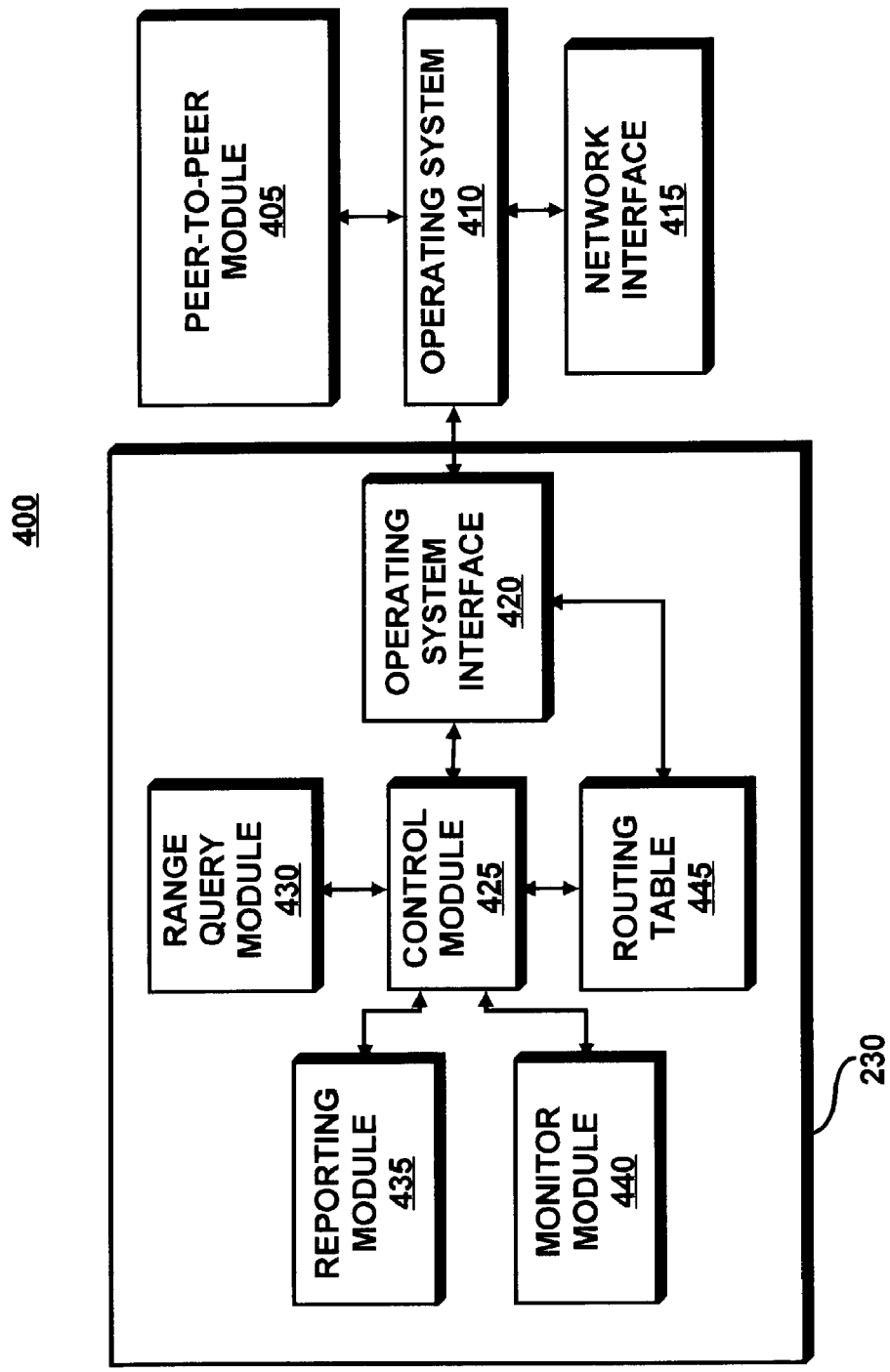
FIG. 4 illustrates an exemplary architecture for the range query module shown in FIG. 1 in accordance with yet another embodiment.

FIG. 4 illustrates an exemplary architecture 400 for the range query module 230 shown in FIG. 1 in accordance with an embodiment. It should be readily apparent to those of ordinary skill in the art that the architecture 400 depicted in FIG. 4 represents a generalized schematic illustration and that other components may be added or existing components may be removed or modified. Moreover, the architecture 400 may be implemented using software components, hardware components, or a combination thereof.

As shown in FIG. 4, the architecture 400 may include a peer-to-peer module, an operating system 420, the range query module 230, and a network interface 415. The peer-to-peer module 410 may be configured to provide the capability to a user of a peer to share information with another peer, i.e., each peer may initiate a communication session with another peer. The peer-to-peer module 410 may be a commercial off-the-shelf application program, a customized software application or other similar computer program. Such programs such as KAZAA, NAPSTER, MORPHEUS, or other similar P2P applications may implement the peer-to-peer module 410.

The range query module 230 may be configured to monitor an interface between the peer-to-peer module 410 and the operating system 410 through an operating system interface 440. The operating system interface 420 may be implemented as an application program interface, a function call or other similar interfacing technique. Although the operating system interface 420 is shown to be incorporated within the range query module 230, it should be readily apparent to those skilled in the art that the operating system interface 420 may also incorporated elsewhere within the architecture of the range query module 230.

The operating system 410 may be configured to manage the software applications, data and respective hardware components (e.g., displays, disk drives, etc.) of a peer. The operating system 410 may be implemented by the MICROSOFT WINDOWS family of operating systems, UNIX, HEWLETT-PACKARD HP-UX, LINUX, RIM OS, and other similar operating systems.

The operating system 410 may be further configured to couple with the network interface 415 through a device driver (not shown). The network interface 415 may be configured to provide a communication port for the respective peer over the network 220 (shown in FIG. 2). The network interface 415 may be implemented using a network interface card, a wireless interface card or other similar input/output device.

The range query module 230 may also include a control module 425, a query module, a reporting module 435, a monitor module 440, and a routing table 445. As previously noted, the range query module 230 may be configured to implement the DHT overlay network for the controlled placement of object in order to facilitate range query for attribute values. The range query module 230 may be implemented as a software program, a utility, a subroutine, or other similar programming entity. In this respect, the range query module 230 may be implemented using software languages such as C, C++, JAVA, etc. Alternatively, the range query module 230 may be implemented as an electronic device utilizing an application specific integrated circuit, discrete components, solid-state components or combination thereof.

The control module 425 of the range query module 230 may provide a control loop for the functions of the DHT overlay network. For example, if the control module 425 determines that a query message has been received, the control module 425 may forward the query message to the query module 430.

The query module 430 may be configured to provide a mechanism for querying for attribute values. As discussed above and in further detail with respect to FIGS. 7A, 8A, and 9A, the query module may implement three different types of queries: flooding, controlled flooding and directed controlled flooding.

The reporting module 435 may be configured to provide a mechanism for responding to query messages from requesters and/or neighboring nodes. The reporting module 435 may also be configured to determine the destination of the query message, which is further explained with respect to FIGS. 7B, 8B, and 9B.

The monitor module 440 may be configured to determine whether to share maintenance and/or reporting responsibilities of an interval with another interval keeper. More particularly, the monitor module 440 may maintain a metric relating to an operation parameter, e.g., processor utilization. If the metric exceeds a threshold value, the monitor module may 440 may select another interval keeper to apportion the interval and nodes, which has been described above and in further detail with respect to FIG. 5.

The routing table 445 may provide a mechanism to determine neighboring zones. The routing table 445 may contain a listing of neighboring zones and the one or more residents in each of the neighboring zones.

Figure 5:
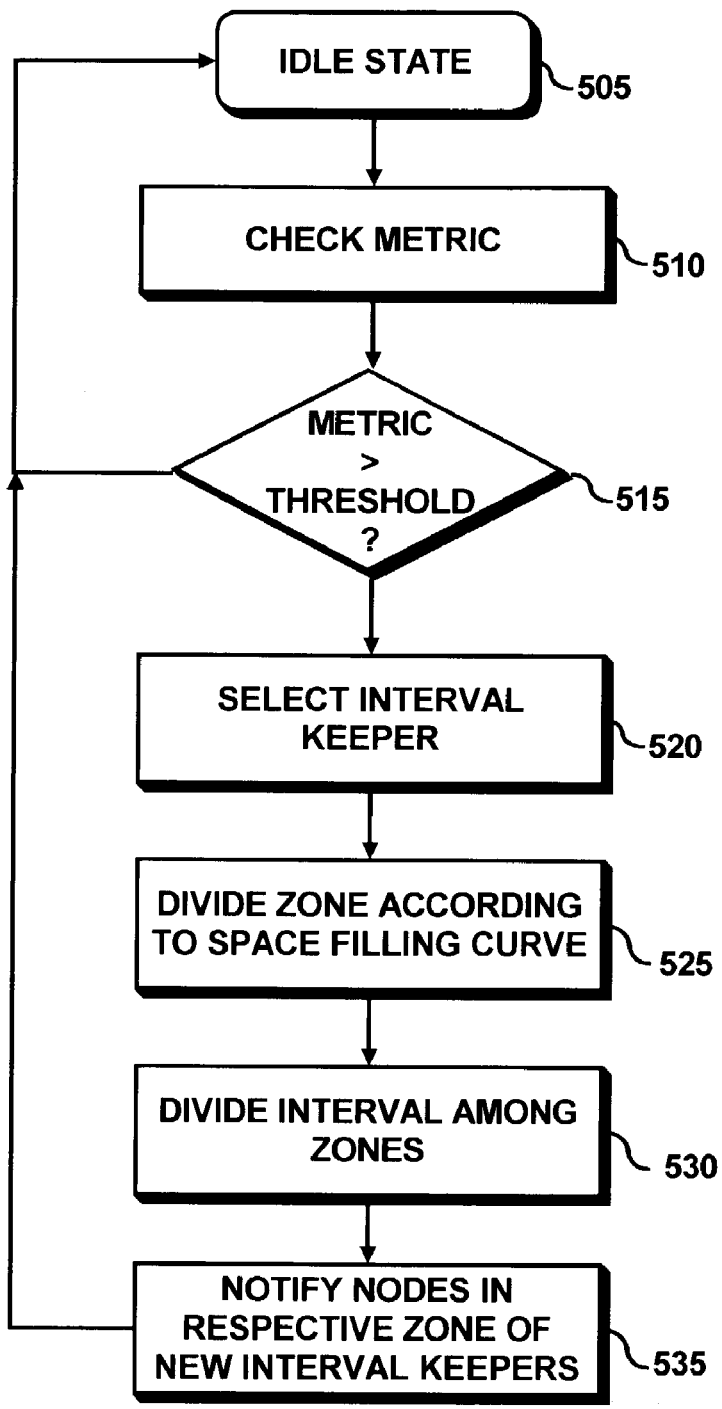
FIG. 5 illustrates an exemplary flow diagram for a DHT overlay network implemented by the monitor module (shown in FIG. 4) according to yet another embodiment.

FIG. 5 illustrates an exemplary flow diagram 500 for the DHT overlay network implemented by the monitor module 440 (shown in FIG. 4) according to an embodiment. It should be readily apparent to those of ordinary skill in the art that this method 500 represents a generalized illustration and that other steps may be added or existing steps may be removed or modified.

As shown in FIG. 5, the monitor module 440 may be in an idle state, in step 505. The control module 425 may invoke a function call to the monitor module 440 based on an event or periodically.

In step 510, the monitor module 425 may be configured to check a metric associated an operating parameter of the node executing the range query module 230. Alternatively, the monitor module 425 may retrieve a metric from a node configured to monitor metrics.

In step 515, the monitor module 425 may be configured to compare the metric with a threshold value. If the metric does not exceed the threshold value, the monitor module 425 may return to the idle state of step 505. Otherwise, if the metric does exceed the threshold value, the monitor module 425 may be configured to select an additional interval keeper. The monitor module 425 may select the additional interval keeper from the nodes within the zone of the node executing the range query module 230.

Subsequently, in step 525, the monitor module 425 may divide the original zone into two zones between the interval keeper executing the monitor module 425 and the additional interval keeper according to a space-filling curve (e.g., a gray-code curve, a z-curve, a Hilbert curve, etc.)

In step 530, the monitor module 425 may apportion the interval of the interval keeper executing the monitor module 425 into two sub-intervals. The assignment of each sub-interval may also be based on the same space-filling curve mentioned in step 525.

In step 535, the monitor module 425 may notify the nodes of their new respective interval keepers based on the attribute values. Subsequently, the monitor module 425 may return to the idle state of step 505.

Figure 6:
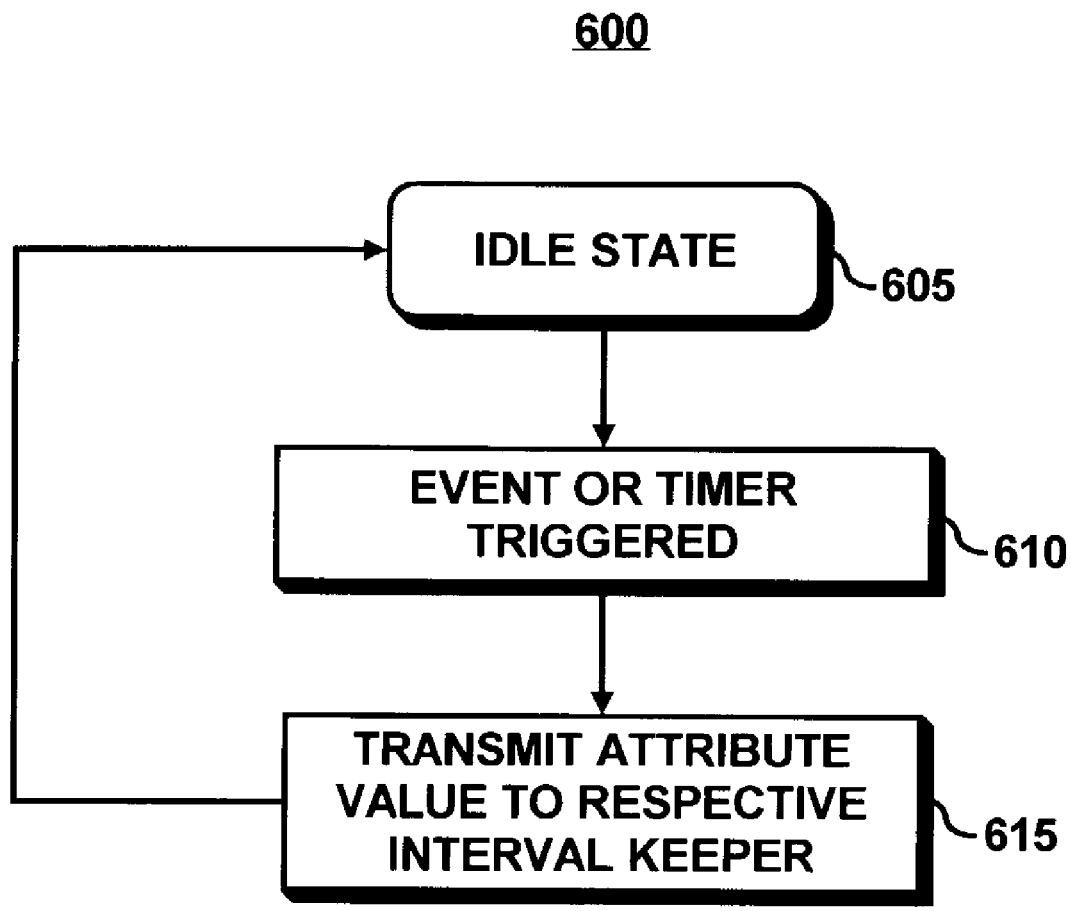
FIG. 6 illustrates an exemplary flow diagram for the reporting module with to reporting attribute values to an interval keeper in accordance with yet another embodiment.

FIG. 6 illustrates an exemplary flow diagram 600 for the reporting module 435 with to reporting attribute values to an interval keeper in accordance with yet another embodiment. It should be readily apparent to those of ordinary skill in the art that this method 600 represents a generalized illustration and that other steps may be added or existing steps may be removed or modified.

As shown in FIG. 6, the reporting module 435 may be in an idle state, in step 605. The reporting module 435 may detect a triggering event or on a periodic basis, in step 610. Subsequently, the reporting module 435 may forward an attribute value to the responsible interval keeper. Thereafter, the reporting module 435 may return to the idle state of step 605.

Figure 7A:
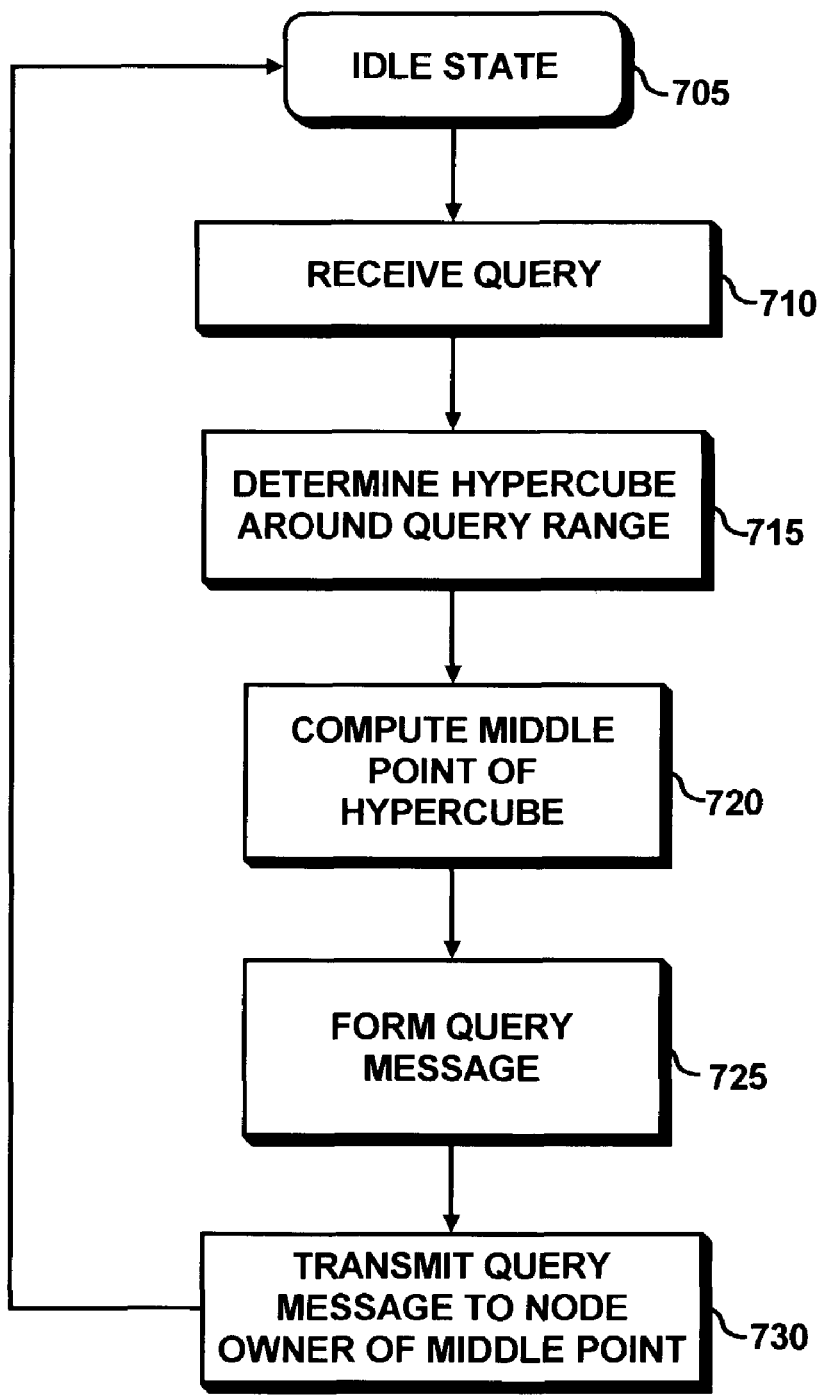
FIG. 7A illustrates an exemplary flow diagram for the query module for implementing a flood query in accordance with yet another embodiment.

FIG. 7A illustrates an exemplary flow diagram 700 for the query module 430 for implementing a flood query in accordance with another embodiment. It should be readily apparent to those of ordinary skill in the art that this flow diagram 700 represents a generalized illustration and that other steps may be added or existing steps may be removed or modified.

As shown in FIG. 7A, the query module 430 may be configured to be in an idle state in step 705. The control module 425 may detect a request through the operating system interface 420 and invoke the query module 430.

In step 710, the query module 430 may be configured to receive the query. The query module 430 may then calculate a minimal-enclosing hypercube, h, in step 715. The query module 430 may generate a few sample points along the requested range of attributes values to determine the hypercube.

In step 720, the query module 430 may be configured to calculate the middle point of the hypercube, p. In step 725, the query module 430 may form a query message that includes the hypercube, h, and the identity of the requester.

In step 730, the query module 430 may forward the query message to the node owner of the middle point of the hypercube, p. The query module 430 may forward the query message through the network interface 415 via the operating system 410 and operating system interface 420. Subsequently, the query module 430 may return to the idle state of step 705.

Figure 7B:
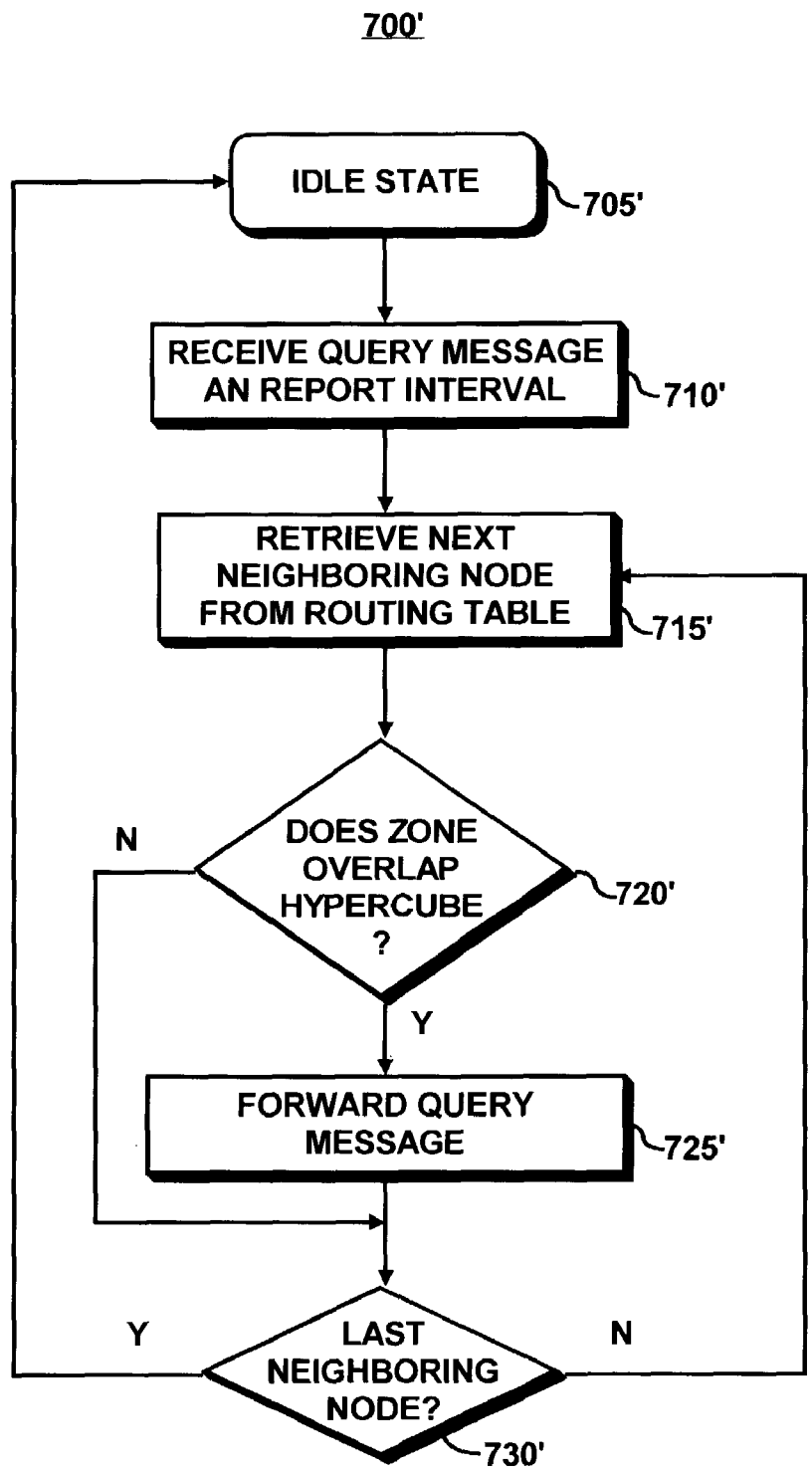
FIG. 7B illustrates an exemplary flow diagram for the reporting module for implementing a flood query response complementary to query module implementing a flood query in accordance with yet another embodiment.

FIG. 7B illustrates an exemplary flow diagram 700' for the reporting module 435 for implementing a flood query response complementary to query module 435 implementing a flood query in accordance with yet another embodiment. It should be readily apparent to those of ordinary skill in the art that this flow diagram 700' represents a generalized illustration and that other steps may be added or existing steps may be removed or modified.

As shown in FIG. 7B, the reporting module 435 may be in an idle state in step 705'. The control module 425 may detect a query message through the operating interface 420. The query message may be received from a requestor or a neighboring node. Subsequently, the control module 425 may invoke the reporting module 435.

In step 710', the reporting module 435 may be configured to receive the query message and report to the requester the attribute values in the interval maintained by the receiving interval keeper. More particularly, the reporting module 435 may form a message that includes the range of attribute values and transmit the message through the network interface 415 via the operating system 410 and operating system interface 420.

In step 715', the reporting module 435 may retrieve each of the neighboring nodes of the receiving interval keeper. For each neighbor node, the reporting module 435 may compare the zone of the selected neighboring node with the hypercube, h, in step 720'. If the zone overlaps the hypercube, h, the reporting module 435 may forward the query message to the selected neighboring node. Subsequently, the reporting module 435 proceeds to the processing of step 730'. Returning to step 720', if the zone of the selected neighboring node does not overlap the hypercube, h, the reporting module 435 may test whether the last neighboring node has been retrieved from the routing table 445. If the last neighboring node has been compared, the reporting module 435 may return to the idle state of step 705'. Otherwise, if there are additional neighboring nodes, the reporting module 435 may return to the processing of step 715'.

Figure 8A:
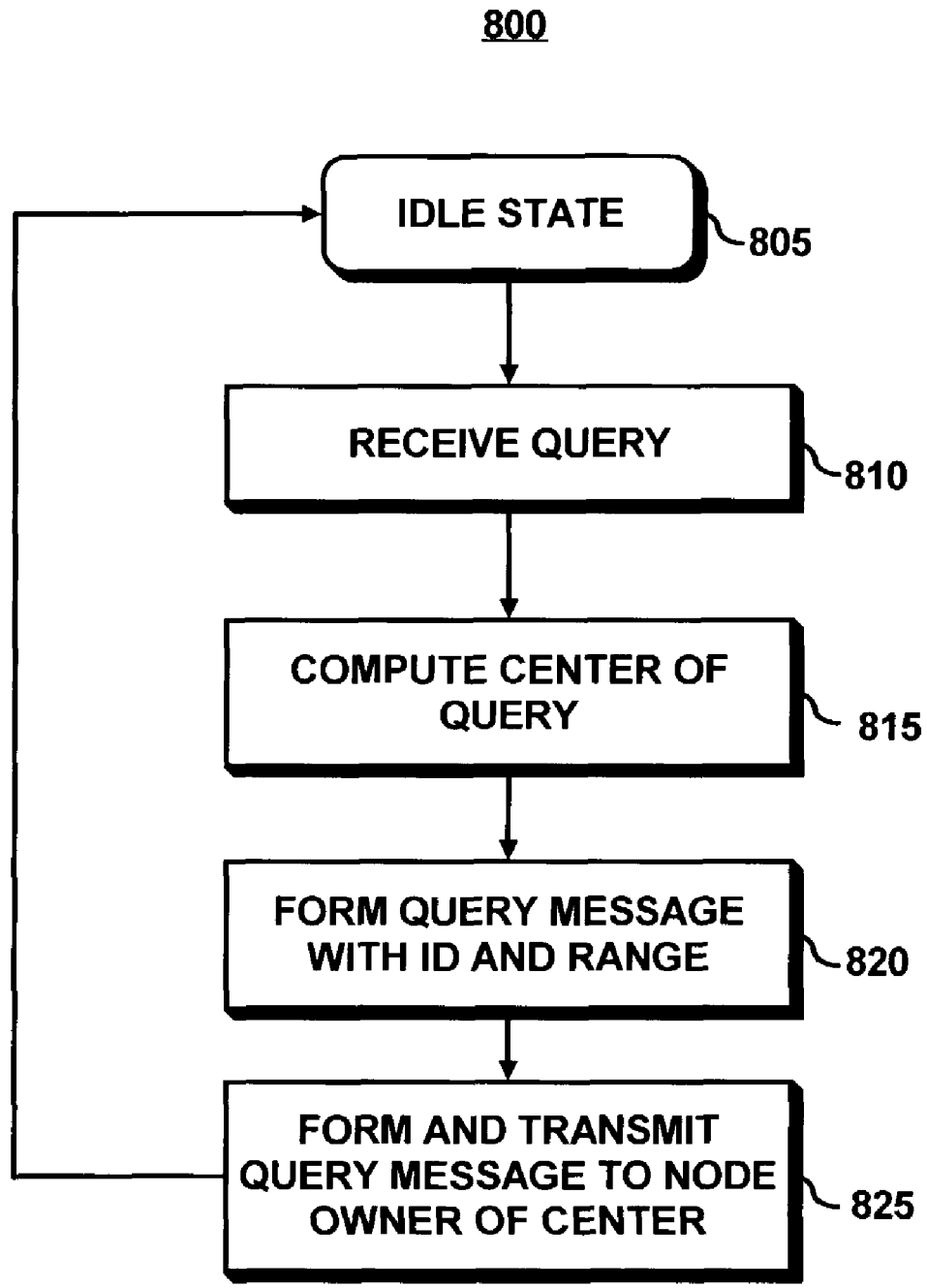
FIG. 8A illustrates an exemplary flow diagram 800 for the query module for implementing a controlled flood query in accordance with yet another embodiment.

FIG. 8A illustrates an exemplary flow diagram 800 for the query module 430 for implementing a controlled flood query in accordance with another embodiment. It should be readily apparent to those of ordinary skill in the art that this flow diagram 800 represents a generalized illustration and that other steps may be added or existing steps may be removed or modified.

As shown in FIG. 8A, the query module 430 may be configured to be in an idle state in step 805. The control module 425 may detect a request through the operating system interface 420 and invoke the query module 430.

In step 810, the query module 430 may be configured to receive the requested range of attribute values. The query module 430 may then compute the center of the requested range of attribute values, p, in step 815.

In step 820, the query module 430 may be configured to form a query message comprising of the identity of the requester and the range of attribute values, p. In step 825, the query module 430 may forward the query message to the node owner of the center of the requested range of attribute values, p. The query module 430 may forward the query message through the network interface 415 via the operating system 410 and operating system interface 420. Subsequently, the query module 430 may return to the idle sate of step 805.

Figure 8B:
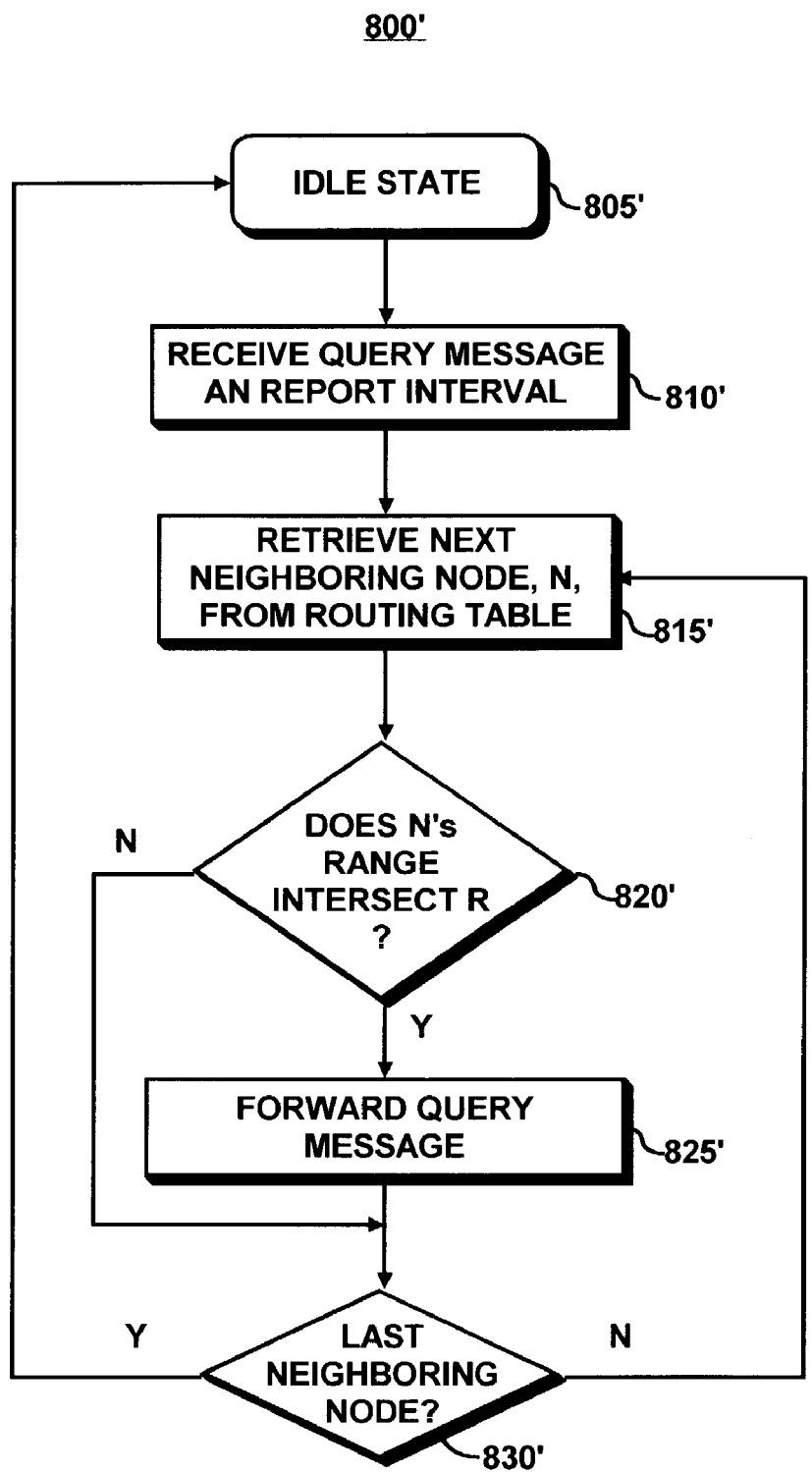
FIG. 8B illustrates an exemplary flow diagram for the reporting module for implementing a controlled flood query response complementary to query module implementing a flood query in accordance with yet another embodiment.

FIG. 8B illustrates an exemplary flow diagram 800' for the reporting module 435 for implementing a controlled flood query response complementary to query module 435 implementing a flood query in accordance with yet another embodiment. It should be readily apparent to those of ordinary skill in the art that this flow diagram 800' represents a generalized illustration and that other steps may be added or existing steps may be removed or modified.

As shown in FIG. 8B, the reporting module 435 may be in an idle state in step 805'. The control module 425 may detect a query message through the operating interface 420. The query message may be received from a requestor or a neighboring node. Subsequently, the control module 425 may invoke the reporting module 435.

In step 810', the reporting module 435 may be configured to receive the query message and report to the requestor the attribute values in the interval maintained by the receiving interval keeper. More particularly, the reporting module 435 may form a message that includes the range of attribute values and transmit the message through the network interface 415 via the operating system 410 and operating system interface 420.

In step 815', the reporting module 435 may retrieve each of the neighboring nodes of the receiving interval keeper. For each neighboring node, the reporting module 435 may compare the range of the selected neighboring node to determine an intersection, in step 820'

If the selected neighboring node's range (or interval) intersects the range of the requested attribute values, r, the reporting module 435 may forward the query message to the selected neighboring node. Otherwise, if the selected neighboring node's range does not intersect with the range of the requested attribute values, r, the reporting module 435 may determine whether the last neighboring node has been tested, in step 830'.

If the last neighboring node has been tested, the reporting module 435 may return to the idle state of step 805'. Otherwise, if the last neighboring node has not been tested, the reporting module 435 may return to the processing of step 815'.

Figure 9A:
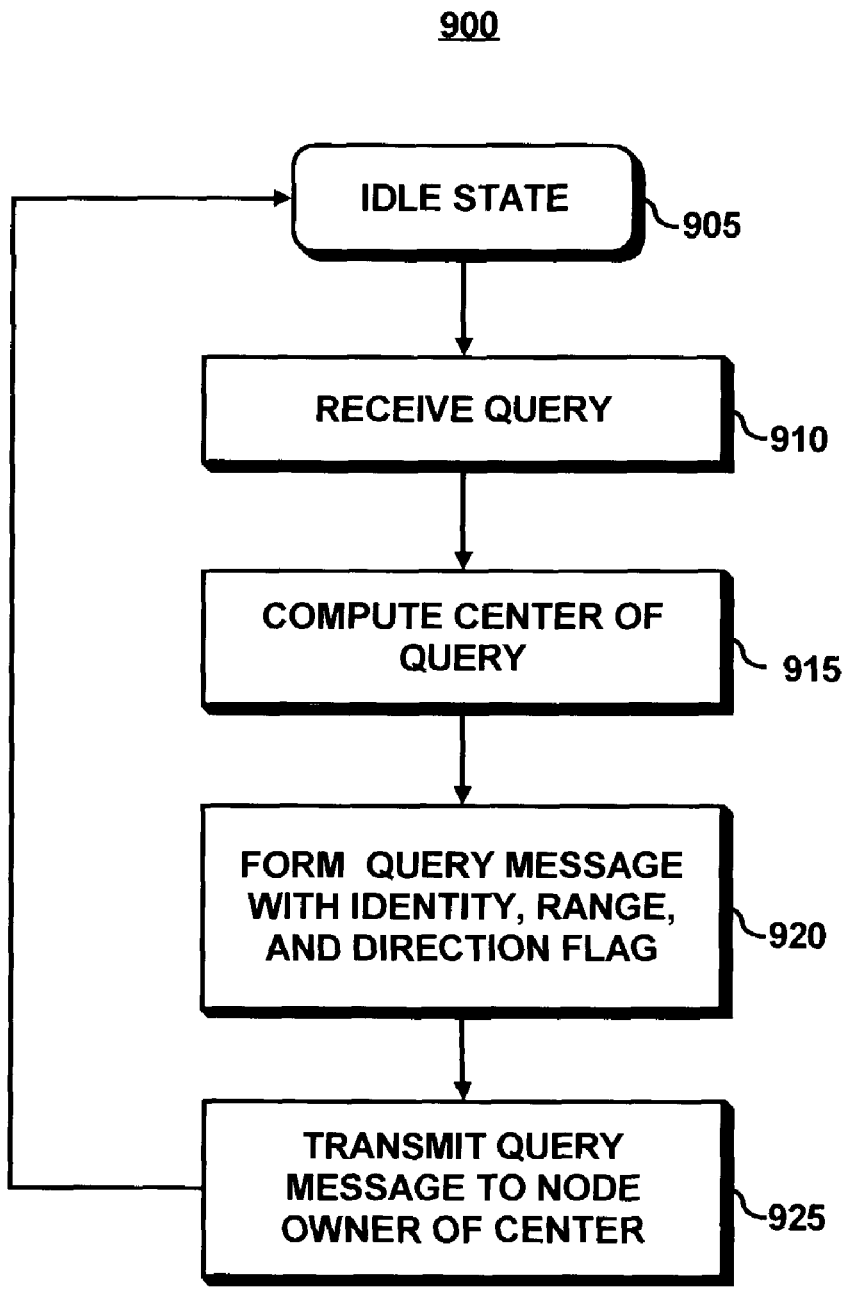
FIG. 9A illustrates an exemplary flow diagram for the query module for implementing a directed controlled flood query in accordance with yet another embodiment.

FIG. 9A illustrates an exemplary flow diagram 900 for the query module 430 for implementing a directed controlled flood query in accordance with another embodiment. It should be readily apparent to those of ordinary skill in the art that this flow diagram 900 represents a generalized illustration and that other steps may be added or existing steps may be removed or modified.

As shown in FIG. 9A, the query module 430 may be configured to be in an idle state in step 905. The control module 425 may detect a request through the operating system interface 420 and invoke the query module 430.

In step 910, the query module 430 may be configured to receive the requested range of attribute values. The query module 430 may then compute the center of the requested range of attribute values, p, in step 915.

In step 920, the query module 430 may be configured to form a query message comprising of the identity of the requester, i, the range of attribute values, p; and a direction flag. The direction flag may indicate which direction the forwarding of the query message should take. For instance, if the direction flag is set for UP, the query message would be forwarded to nodes that ranges greater than the receiving interval keeper. As another example, if the direction flag is set for DOWN, the query message would be forwarded to nodes that ranges are lesser than the receiving interval keeper.

In step 925, the query module 430 may forward the query message to the node owner of the center of the requested range of attribute values, p. The query module 430 may forward the query message through the network interface 415 via the operating system 410 and operating system interface 420. Subsequently, the query module 430 may return to the idle sate of step 905.

Figure 9B:
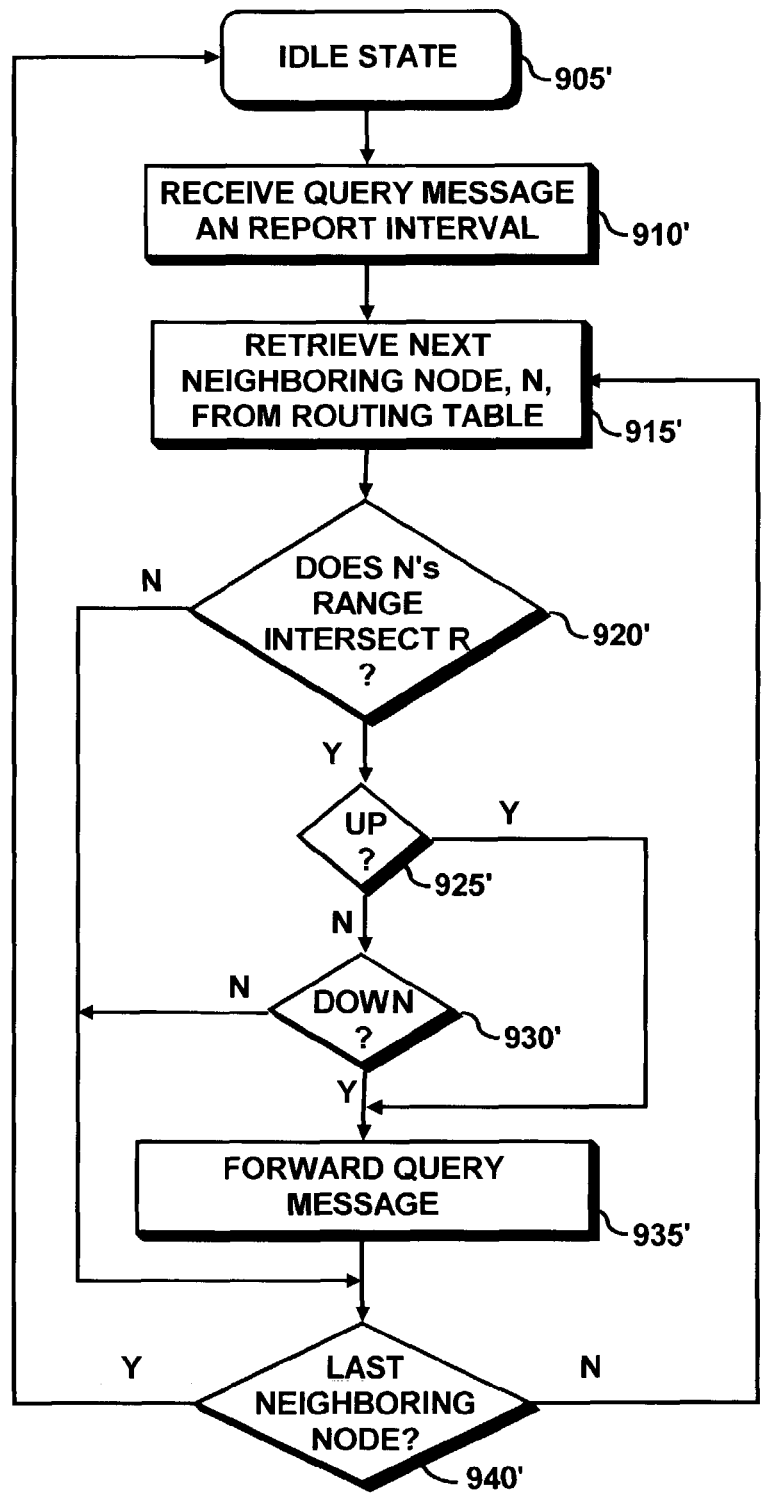
FIG. 9B illustrates an exemplary flow diagram for the reporting module for implementing a controlled flood query response complementary to query module implementing a flood query in accordance with yet another embodiment.

FIG. 9B illustrates an exemplary flow diagram 900' for the reporting module 435 for implementing a controlled flood query response complementary to query module 435 implementing a flood query in accordance with yet another embodiment. It should be readily apparent to those of ordinary skill in the art that this flow diagram 900' represents a generalized illustration and that other steps may be added or existing steps may be removed or modified.

As shown in FIG. 9B, the reporting module 435 may be in an idle state in step 905'. The control module 425 may detect a query message through the operating interface 420. The query message may be received from a requester or a neighboring node. Subsequently, the control module 425 may invoke the reporting module 435.

In step 910', the reporting module 435 may be configured to receive the query message and report to the requestor the attribute values in the interval maintained by the receiving interval keeper. More particularly, the reporting module 435 may form a message that includes the range of attribute values and transmit the message through the network interface 415 via the operating system 410 and operating system interface 420.

In step 915', the reporting module 435 may retrieve each of the neighboring nodes of the receiving interval keeper. For each neighboring node, the reporting module 435 may compare the range of the selected neighboring node to determine an intersection, in step 920'

If the selected neighboring node's range (or interval) does not intersect with the range of the requested attribute values, r, the reporting module 435 may determine whether the last neighboring node has been tested, in step 940'. Otherwise, if the selected neighboring node's range intersects with the range of the requested attribute values, r, the reporting module 435 may compare whether the selected neighboring node's range is greater than the receiving interval keeper's range and the direction flag has been set for UP, in step 925'. If the selected neighboring node's range is greater than the receiving interval keeper's range and the direction flag is set for UP, the reporting module 435 may forward the query message to the selected neighboring node.

Otherwise, the reporting module 435 may determine whether the selected neighboring node's range is less than the receiving interval keeper's range and the direction flag has been set for DOWN. If the conditions are true, the reporting module 435 may forward the query message to the selected neighboring node. Otherwise, if the conditions are not both true, the reporting module 435 may determine whether the last neighboring node has been reached in the routing table 445, in step 940'.

If the last neighboring node has been reached, the reporting module 435 may return to the idle state of step 905'. Otherwise, if the last neighboring node has not been tested, the reporting module 435 may return to the processing of step 915'.

Figure 10:
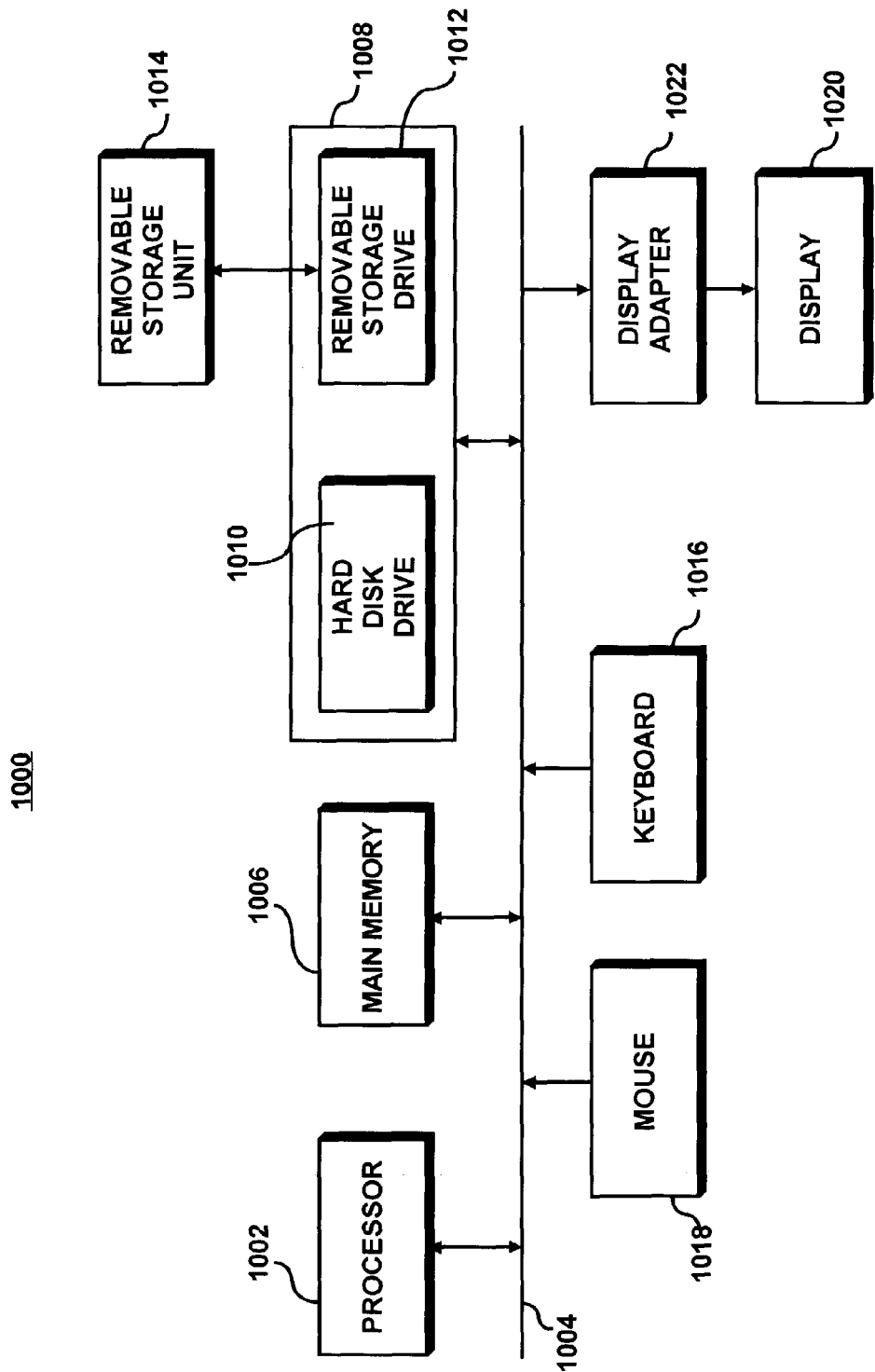
FIG. 10 illustrates a computer system where an embodiment may be practiced.

FIG. 10 illustrates an exemplary block diagram of a computer system 1000 where an embodiment may be practiced. The functions of the range query module may be implemented in program code and executed by the computer system 1000. Modules in the computer system 1000 may be implemented in computer languages such as PASCAL, C, C++, JAVA, etc.

As shown in FIG. 10, the computer system 1000 includes one or more processors, such as processor 602, that provide an execution platform for embodiments of the modules executed by the computer system 1000 (e.g., modules 425-440 shown in FIG. 4). Commands and data from the processor 1002 are communicated over a communication bus 1004. The computer system 1000 also includes a main memory 1006, such as a Random Access Memory (RAM), where the software for the range query module may be executed during runtime, and a secondary memory 1008. The secondary memory 1008 includes, for example, a hard disk drive 1010 and/or a removable storage drive 1012, representing a floppy diskette drive, a magnetic tape drive, a compact disk drive, etc., where a copy of a computer program embodiment for the range query module may be stored. The removable storage drive 1012 reads from and/or writes to a removable storage unit 1014 in a well-known manner. User input and output devices may include a keyboard 1016, a mouse 1018, and a display 1020. The display adaptor 1022 interfaces with the communication bus 1004 and the display 1020 and receives display data from the processor 1002 and converts the display data into display commands for the display 1020.

Certain embodiments may be preformed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of storing attribute values at a plurality of nodes in a peer-to-peer network, wherein the attribute values represent attributes of computing resources in a system, the method comprising:
    receiving an attribute value for a computing resource;
    identifying a node of the plurality of nodes for storing the attribute value, wherein the node stores a range of attribute values encompassing the received attribute value; and
    storing the attribute value at the identified node.

2. The method of claim 1, wherein identifying a node comprises calculating a location for storing the attribute value in the peer-to-peer network using a space-tilling curve.

3. The method of claim 2, further comprising:
    transmitting the calculated location and attribute value to a first node in the peer-to-peer network;
    routing the attribute value from the first node to a node associated with the calculated location; and
    the step of storing the attribute value comprises storing the attribute value at the node.

4. The method of claim 3, wherein storing the attribute value comprises storing a key pair comprised of the attribute value and a resource identifier in an index in the node.

5. The method of claim 4, wherein the peer-to-peer network comprises a distributed-hash-table, overlay network, and the index is an index in the distributed-hash-table.

6. The method of claim 5, wherein indexes in the peer-to-peer network are searchable to identify one or more computing resources in the system having one or more attributes identified by a query.

7. The method of claim 2, wherein the space-filling curve comprises one of a Hilbert curve, a gray-code curve, and a z-curve.

8. The method of claim 2, further comprising:
    determining whether the identified node is overloaded; and
    identifying a new node for storing the attribute value based on the space filling curve in response to the new node being overloaded, wherein
    storing the attribute value comprises storing the attribute value at the new node.

9. The method of claim 1, wherein the node stores discrete attribute values in addition to the range of attribute values.

10. The method of claim 1, wherein the system is a grid and the plurality of nodes are computing resources in the grid storing attribute values for substantially all computing resources in the grid.

11. The method of claim 10, further comprising receiving attribute values from substantially all the computing resources in the grid for storage in the peer-to-peer network using a space filling curve such that similar attribute values are stored in proximity in the peer-to-peer network.

12. The method of claim 10, wherein attribute values comprise at least one of processing speed, memory, operating system, and platform-type.

13. The method of claim 1, further comprising updating the node with at least one additional attribute value.

14. The method of claim 13, wherein updating comprises:
    storing information including an attribute value and a node identification for a node storing the attribute value;
    identifying a node identification for the node being updated with the at least one additional attribute value from the stored information based on a previously stored attribute value; and
    transmitting the additional attribute value directly to the node being update using the node identification.

15. The method of claim 1, wherein the peer-to-peer network comprises a distributed-hash-table, overlay network, each node of the peer-to-peer network owning a zone in the overlay network, and identifying a node of the plurality of nodes for storing the attribute value comprises:
    mapping each zone to a range of attribute values, such that nodes having close-by ranges also own zones that arc proximally located in the overlay network; and
    identifying a node storing a range of values encompassing the received attribute value.

16. The method of claim 15, wherein the steps of mapping and identifying use a space-filling curve.

17. A method of identifying one or more computing resources in a system meeting s query, wherein the system includes a peer-to-peer network indexing attributes for computing resources in the system, the method comprising:
    receiving a query including a range of the attribute values;
    identifying an area in the peer-to-peer network associated with the range of attribute values; and
    flooding the query in the area.

18. The method of claim 17, wherein the peer-to-peer network comprises a distributed-hash-table, overlay network, each node of the peer-to-peer network owning a zone in the overlay network, and identifying an area in the peer-to-peer network associated with the range of attribute values from the query comprises:
    mapping each zone to a range or attribute values, such that nodes having close-by ranges also own zones that are proximally located in the overlay network; and
    identifying an area in the overlay network comprising all zones having an associated range of attribute values intersecting the range of attribute values from the query.

19. The method of claim 18, wherein mapping each zone comprises mapping each zone to a range of attribute values based on a space-tilling curve.

20. The method of claim 19, wherein identifying an area in the overlay network comprises calculating a smallest hypercube area in the overlay network encompassing all zones having an associated range of attribute values intersecting the range of attribute values from the query, the hypercube area being calculated using a Hilbert function.

21. The method of claim 20, wherein flooding the query in the area comprises routing the query in the urea only to at least one neighbor node storing attribute values intersecting the range of attribute values from the query.

22. The method of claim 21, wherein an initial node initially routing the query comprises a node in the overlay network storing an attribute value substantially at a center of the range of attribute values from the query.

23. The method of claim 20, wherein flooding the query in the area comprises:
routing the query from an initial node to at least one neighbor storing at least one attribute value greater than and intersecting the range of attribute values from the query.

24. The method of claim 23, wherein flooding the query in the area comprises:
routing the query from an initial node to at least one neighbor storing at least one attribute value less than and intersecting the range of attribute values from the query.

25. An apparatus comprising
means for receiving an attribute value for a computing resource in a system;
means for identifying a node in a peer-to-peer network for storing the attribute value, wherein the identified node stores a range of attribute values including the received attribute value; and
means for routing the attribute value to the identified node.

26. The apparatus of claim 25, wherein each node in the peer-to-peer network stores a range of attribute of values, such that nodes storing close-by ranges are proximally located in the peer-to-peer network.

27. The apparatus of claim 25, further comprising:
means for receiving a query including a range of attribute values; and
means for identifying an area in the peer-to-peer network associated with the range of attribute values from the query.

28. The apparatus of claim 27, further comprising means for flooding the query in the area.

29. The apparatus of claim 27, further comprising means for routing the query from an initial node in the peer-to-peer network to neighbor nodes in the peer-to-peer network storing attribute values intersecting the range of attribute values from the query.

30. The apparatus of claim 27 further comprising means for routing the query from an initial node in the peer-to-peer network to neighbor nodes in the peer-to-peer network storing attribute values intersecting and greater than the range of attribute values from the query.

31. The apparatus of claim 27 further comprising means for routing the query from an initial node in the peer-to-peer network to neighbor nodes in the peer-to-peer network storing attribute values intersecting and less than the range of attribute values from the query.

* * * * *

UNITED STATES PATENT AND TRADEMARK OFFICE
CERTIFICATE OF CORRECTION

PATENT NO. : 7,805,448 B2
APPLICATION NO. : 10/418075
DATED : September 28, 2010
INVENTOR(S) : Artur Andrzejak et al.

It is certified that error appears in the above-identified patent and that said Letters Patent is hereby corrected as shown below:

In column 13, line 50, in Claim 2, delete "space-tilling curve" and insert -- space-filling curve --, therefor.

In column 14, line 49, in Claim 17, delete "s query" and insert -- a query --, therefor.

In column 14, line 62, in Claim 18, delete "or" mid insert -- of --, therefor.

In column 15, line 3, in Claim 19, delete "space-tilling curve" and insert -- space-filling curve --, therefor.

In column 15, line 11, in Claim 21, delete "urea" and insert -- area --, therefor.

Signed and Sealed this
Fifth Day of April, 2011

David J. Kappos
*Director of the United States Patent and Trademark Office*